Patented May 24, 1932

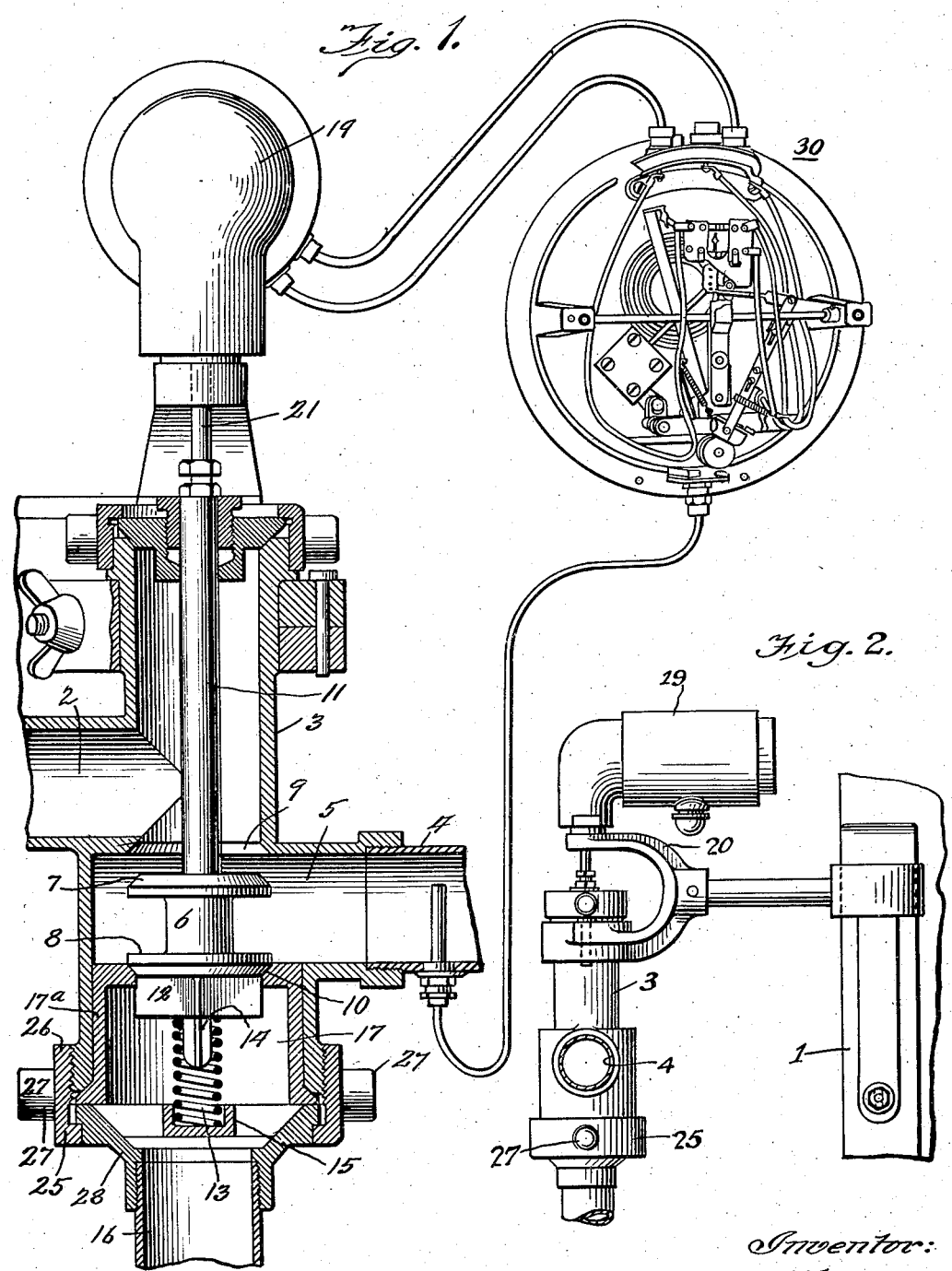

1,859,504

UNITED STATES PATENT OFFICE

HAROLD S. FIELDER, OF CHICAGO, ILLINOIS, ASSIGNOR, BY MESNE ASSIGNMENTS, TO CHERRY-BURRELL CORPORATION, OF CHICAGO, ILLINOIS, A CORPORATION OF DELAWARE

PASTEURIZING APPARATUS

Application filed July 15, 1927. Serial No. 206,025.

My invention relates to apparatus for pasteurizing or otherwise treating liquids in connection with certain temperature requirements.

One of the objects of the invention is to provide a simple, practical and effective form of apparatus of the class specified.

Another object of the invention is to permit liquid to be continuously supplied to the treatment or pasteurizing chamber while the temperature requirements are met,—as for example, while the temperature is up to a certain point.

Another object of the invention is to stop the flow of liquid to the treatment or pasteurizing chamber when the temperature requirements are not met, as for example, when it falls below such predetermined point.

Another object of the invention is to permit the liquid to flow again to the treatment or pasteurizing chamber, upon the restoration of temperature requirements as for instance, when the temperature is restored to said predetermined point.

Another object is to secure the foregoing and other desirable results in a simple and expeditious manner.

In this application I show the invention applied to pasteurizing apparatus, although it will be understood that it may be applied to other forms of apparatus as well.

In the accompanying drawings:

Fig. 1 is a cross sectional view of a pasteurizing apparatus embodying my invention;

Fig. 2 is a side elevation of the same.

Referring to the drawings, I show a pasteurizing tank or holder 1, to which is extended a feed pipe 2 carrying the liquid to be pasteurized or treated. This feed pipe 2 extends to a structure 3 which receives liquid from a pump, or by gravity or otherwise through a supply pipe 4.

The structure 3 preferably contains a valve chamber 5 in which is arranged a valve structure 6 preferably provided with two valves 7 and 8. Structure 3 also has a port 9 controlled by valve 7 and another port 10 controlled by valve 8. A valve stem 11 preferably extends upwardly from valve 7 and wings 12 are preferably arranged below valve 8 so as to guide the valve structure. A spring 13 is preferably arranged below wings 12 and in contact with the same and a tongue or projection 14 is preferably secured to the valve structure so as to guide and steady the upper end of spring 13. Spring 13 is seated in a seat or concave member 15. A pipe 16 is arranged at the lower portion of structure 3 and opens into a chamber 17 which communicates through port 10 to a chamber 5.

When valve structure 6 is in its lowermost position, as shown in Fig. 1, liquid may come through suppply pipe 4 into chamber 5 and thence through port 9 into pipe 2 and be discharged in the tank or holder 1. When, however, valve structure 6 is elevated, valve 7 will close port 9 and valve 8 will open port 10 and as a result liquid coming through pipe 4 will not pass into and through pipe 2, but will pass through port 10 and into pipe 16 and by the latter will be returned to the pump, or otherwise circulated, so that it is diverted from the pasteurizing or treatment chamber.

Arrangement is preferably made by which this automatic control may be effected so as to cause this by-pass or return circulation when the liquid becomes too cool for pasteurization and to restore the flow of the liquid to the pasteurizing chamber when the liquid is again heated to proper temperature.

In the arrangement shown for carrying this out, which it is understood is only one of a number of arrangements which could be used for the purpose, I show a thermal device 19, preferably mounted on an arm or support 20 attached to structure 3 and adapted to control the valve mechanism in the manner described. This element 19 may be a Dickson motor operated device for controlling valves, being a device known on the market as sensitive to changes in thermostatic control so that it will operate when temperature varies. This element 19 is provided with a downwardly extending spindle or plunger 21 which is arranged above valve spindle 11 and adapted to cooperate with the same.

Thus, when the temperature of the liquid is sufficiently high the member 19 will cause plunger 21 to descend and push valve stem 11 downwardly and thereby open port 9 and permit liquid to pass into the pasteurizing chamber. When, however, the temperature of the liquid becomes too low for pasteurization element 19 will cause spindle or plunger 21 to rise, thereby permitting spring 13 to push valve structure 6 upwardly and close port 9 and open port 10 and prevent the passage of liquid into the pasteurizing chamber and cause it to be circulated by the pump. This circulation will continue and the liquid will be heated until the latter again reaches the proper temperature, whereupon element 19 will cause plunger 21 to descend and again lower valve structure 6 and operate the by-pass valve arrangement so as to permit liquid to flow again through port 9 and into the pasteurizing chamber.

The element 19 is connected or associated with the liquid heater so as to be controlled by the same, as, for example, by means of a Leeds & Northrup thermostatic control mechanism 30 so as to accomplish the aforesaid automatic regulation. In this way the desirable result will be secured, as previously pointed out. The bulb or member to which heat is imparted so as to effect this thermal control, is located between the pump or other source of supply, or in other words, "in front of" the valve mechanism involving member 3 and associated parts, so that changes in temperature, particularly the change from sub-normal to normal, may effect the operation of the apparatus and cause it to operate properly.

The port 10 is preferably formed by a removable valve seat and this removability is advantageously secured by making such valve seat the upper portion of a removable member 17ª and having the latter form the chamber 17. The removability of member 17ª may be obtained by fitting it in the lower portion of structure 3 and holding it in place by a ring or annulus 25 having threaded connection at 26 with lower portion of member 3 and provided with projections 27 by which it may be turned. Pipe 16 is also preferably removably attached as by providing a removable fitting 28 also desirably held in place by ring or annulus 25.

By this arrangement the valve seat for valve 8 may be removed and valve structure 6 also removed and these and associated parts thoroughly washed thereby making the device sanitary, which, of course, is highly desirable in pasteurizing apparatus. Repair and replacement of parts is also permitted by this arrangement.

It will be understood that changes and modifications may be made without departing from the spirit of the invention.

What I claim is:

1. In apparatus of the class specified, the combination of a valve holding structure provided with inlet and outlet passages, a valve arranged within said valve holding structure and means forming a removable valve seat for said valve, said means comprising a removable member providing a chamber having an aperture which forms the valve seat, a ring or annulus having threaded connection with the valve holding structure, and a fitting also held in place by said ring or annulus and in turn holding said valve chamber structure removably in position.

2. An apparatus of the class specified in combination with a pasteurizing chamber, a pipe for feeding fluid thereinto, of a valve chamber in said pipe, said valve chamber containing valves; a by-pass communicating with the said valve chamber; thermically operated means outside of the said valve chamber for automatically controlling the said valves for directing the fluid flow either to the pasteurizing chamber or to the by-pass, depending upon the temperature of the fluid flowing toward the pasteurizing chamber.

3. An apparatus of the class specified in combination with a pasteurizing chamber, a pipe for feeding fluid thereinto, of a valve chamber in said pipe, said valve chamber containing valves; a by-pass communicating with the said valve chamber, a valve for the feed pipe and a valve for the by-pass, the said valve chamber being free of all obstruction excepting one of the valves, the other of said valves forming a part of the valve-chamber wall.

4. In a milk pasteurizing apparatus, the combination of a control structure, said control structure including a valve body containing an inlet and two outlets, the inlet being connected to a milk treating device, one of the outlets leading to a storage for the pasteurized milk and the other outlet leading back to the milk treating device; a valve-operating stem with valve disks thereon for controlling the outlets; a stuffing box on the valve body through which the said valve stem protrudes for connection to operating means, said means consisting of a power device located outside of the valve body; temperature-responsive means within the inlet for controlling the said power device whereby one of the outlets will be closed and the other opened depending upon the temperature of the milk flowing through the inlet pipe.

5. In a pasteurizing control system, a pasteurizing chamber, an inlet into said chamber for admitting fluid thereto, a supply connection with said inlet, a return connection from said inlet by passing said chamber, a valve in said inlet for connecting the supply to the inlet or by pass, a motor for operating said valve, a temperature responsive element in said supply connection, a controlling element mounted remote from said supply, connections from the device to said element, and means operated by said device for energizing said motor.

6. In a pasteurizing control system a pasteurizing chamber, an inlet into said chamber for admitting fluid thereto, a supply connection to said inlet, a return connection from said inlet by passing said chamber, a valve in said inlet for connecting said supply to the inlet or by pass, a motor for operating said valve mounted outside of said inlet and connections, a temperature responsive element mounted in said supply connection, and means operated by said controlling element for energizing said motor.

7. In a milk pasteurizing apparatus the combination of a pasteurizing chamber, an inlet to said chamber, a supply connection to said inlet, a valve structure mounted between the inlet and supply connection, controlling means located outside of said inlet and connection for operating said valve, connections between said controlling means and said valve, and means for removing said valve structure while maintaining said connections.

8. In a milk pasteurizing apparatus the combination of a pasteurizing chamber, an inlet to said chamber, a supply connection to said inlet, a valve structure mounted between the inlet and supply connection, controlling means located outside of said inlet and connection for operating said valve, connections between said controlling means and said valve, means for removing said valve structure while maintaining said connections, a temperature responsive element mounted in said supply connection and means controlled by said element for operating said controlling device to actuate said valve.

In witness whereof, I hereunto subscribe my name this 2nd day of July, A. D. 1927.

HAROLD S. FIELDER.